Patented July 8, 1924.

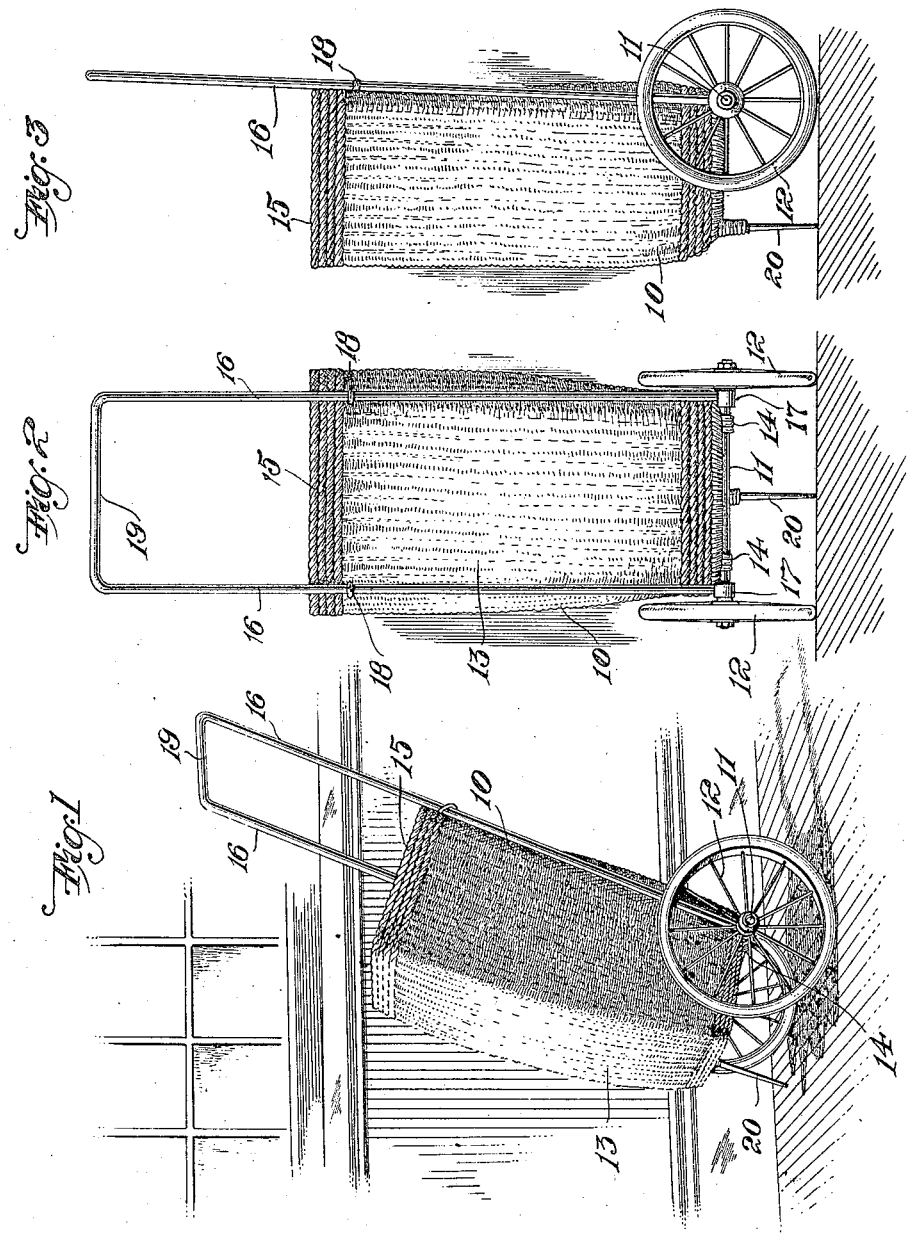

1,500,108

UNITED STATES PATENT OFFICE.

GRACE T. CLAYTON, OF CHEVY CHASE, MARYLAND.

SHOPPING OR MARKETING TRUCK.

Application filed September 27, 1920. Serial No. 413,045.

*To all whom it may concern:*

Be it known that I, GRACE T. CLAYTON, citizen of the United States, residing at Chevy Chase, county of Montgomery, and State of Maryland, have invented certain new and useful Improvements in Shopping or Marketing Trucks; and I do hereby declare the following to be a full, clear, and exact description of the invention, such as will enable others skilled in the art to which it appertains to make and use the same.

This invention relates to shopping or marketing trucks; and it is concerned more particularly with a wheeled article carrier comprising a combination of a receptacle and supporting frame, particularly adapted for use by housekeepers as a convenient portable carrier for packages, parcels and the like, and which, while possessing all the advantages of the usual market basket, as well as other advantages to be hereinafter pointed out, is free of the disadvantages inseparable from the usual market basket.

Trucks intended for use in shopping and marketing have been proposed heretofore; but such proposed devices have not proved satisfactory for practical use because they fail to take account of, or to meet, the somewhat exacting requirements of the class of service in which it has been proposed to employ them.

Lightness is a consideration of primary importance in a shopping truck. Since such trucks are to be used largely by women in doing their marketing or shopping, and since this very commonly involves boarding and alighting from street cars or other vehicles, it is very essential that the weight of the truck be kept down to the lowest practical limit in order that it may be lifted from the floor or ground under such circumstances with minimum effort.

While lightness is important, it is also essential that the construction be sufficiently strong and sturdy to withstand considerable rough handling; and it will be observed that this requirement runs more or less counter to that of lightness. As will hereinafter appear, both requirements are successfully met in the construction of the present invention, wherein the basket or other container and the framework upon which it is carried cooperate to provide a combined structure which is amply strong and in which the parts so mutually contribute to the support and security of each other as to enable the employment of much lighter materials and parts than would otherwise be feasible.

Not only should a truck of this kind be light, but it should also embody provision whereby it can be lifted and carried when occasion demands, while leaving both hands of the user free for other activities. This object is attained in accordance with this invention by employing a supporting frame that extends upwardly beyond the basket or other container to form a loop or bail, whereby the device as a whole may be carried on the arm, like a market basket. Moreover, the arrangement may advantageously be such that, when the truck stands substantially vertical, the cross-bar or bail of the frame is at or slightly below the level of the forearm of the average user, when the arm is bent to loop it through said bail. By virtue of this arrangement, the truck can be carried swung over the arm close to the body like an ordinary basket, with the running wheels just clearing the ground, this being accomplished easily and comfortably and with a minimum expenditure of effort. The bail also serves as a handle bar for rolling and guiding the truck along the ground or pavement.

Still another important feature of the present novel construction is the employment of a container, whether of the basket or some other type, having at its open upper end or mouth a non-collapsible rim, so that the container is permanently open to receive articles to be deposited therein. This does not preclude the employment, when considered desirable, of a removable cover of some kind which can be adjusted so as not to interfere with ready access to the interior of the container during such periods as it is desired to leave the container uncovered for deposit of articles therein.

It is also important that the truck occupy as little floor space as possible when the user is in a street car or other vehicle, for example; and to this end the basket or other container employed in the present construction is advantageously of relatively small traverse sectional area and made rather deep to attain the requisite carrying capacity. Moreover the container is best of a flattened form or contour so that it can be stood close to the user seated or standing in a street car, for example, without taking up as much room as the usual market basket of like capacity.

The foregoing novel features and advantages of the invention, as well as others, will be clear from the following detailed description of a typical construction shown in the accompanying drawings and embodying the principles of the invention. In these drawings, Fig. 1 is a three-quarters view in perspective of a package carrier embodying the principles of the invention; and Figs. 2 and 3 are a rear and side elevation, respectively, of the same.

The package carrier or truck comprises a suitable receptacle or container 10, which in this instance takes the form of a basket or light hamper of reed properly woven to form, the basket having a flattened rectangular transverse cross-section of relatively small area, and being comparatively deep or elongated in the direction of its upright axis. The basket rests upon the axle 11, upon which are mounted light wire wheels 12, said wheels being desirably provided with rubber tires as here illustrated. The basket is firmly secured to said axle 11, which is arranged adjacent and parallel to the lower edge of one of its broader sides 13, by any suitable means, in this instance by means of strands 14 of reed interwoven with the bottom portion of the basket or hamper. The basket is also secured, most desirably near the rim 15 around the open upper end or mouth, to arms or side members 16 of a flat open U-shaped frame, the free lower ends of which arms or side members are firmly secured to the axle 11, as indicated at 17. Strands 18 of reed, looped around the members 16 and woven into the basket fabric provide suitable fastening means in this instance for securing the basket to the frame; but other means may of course be employed for this purpose.

The U-frame extends upwardly some distance beyond the basket, as shown, to provide a cross bar or handle bar 19, which serves both as means for guiding and rolling the shopping truck along the ground, and also as means whereby the truck may be lifted and carried with the cross bar resting in the crook of the arm, as when getting into or out of a street car or other vehicle. It is desirable to provide a support or foot 20 by which the truck is enabled to stand upright alone, as shown in Figs. 2 and 3. In this instance the foot 20 is attached directly to the basket container itself. When the truck is tipped rearwardly into running position, as shown in Fig. 1, the foot is lifted sufficiently not to interfere with rolling the truck along the ground, and at the same time it need not project beyond the front wall of the container.

It will be observed that in this instance, not only the open upper end or mouth of the basket is non-collapsible, but the whole container is of relatively stiff construction resistant to deformation. It is also to be noted that by firmly securing the basket to the frame members 16, and in this instance also to the axle 11, the light but stiff container and the flat open supporting framework formed by the axle 11 and the U-frame members 16, 19, coact to provide a resultant combined structure which is inherently strong and rigid by reason of its box-like form. On this account, the supporting framework can be made of light metal rod without sacrificing the required strength and sturdiness of construction. In this instance the U-frame is formed of a single piece of small metal rod bent into proper shape. The whole truck need weigh but little, if any, more than the ordinary market basket of equivalent carrying capacity. The structural stiffness of the assemblage is further enhanced by slightly decreasing the dimensions of the basket near the base so that the sides thereof for some little distance upward at the rear portion will fit snugly between and slightly to the rear of the side members 16 of the U-frame. The body of the basket may flare upwardly and forwardly to a somewhat greater diameter at the top and front as appears most clearly in Figs. 1 and 2. This particular shaping of the basket is not indispensable, of course, but it contributes generally to the strength and compactness of the device, and also to its pleasing appearance.

Because of its small cross-sectional area and especially its comparatively small front-to-rear breadth, the truck or carrier may be taken aboard a street car or other conveyance and placed in upright position in front of the seated user without blocking the aisle as would an ordinary market basket of equal capacity.

What I claim is:

1. An article truck comprising the combination, with a substantially flat inverted U-frame and a pair of running wheels secured to said frame adjacent the lower ends of the U arms, of a vertically elongated non-collapsible basket, open only at its upper end and having a flattened rectangular cross-section, secured flatwise to said frame, said frame extending upwardly beyond said container to provide both a handle bar and a bail.

2. An article truck comprising, in combination, an open frame consisting of a single piece of metal looped to provide a carrying bail and handle bar, an axle secured to the ends of said looped frame, wheels on the axle, and a receptacle secured to said frame and said axle.

3. An article truck comprising, in combination, an open frame consisting of a single piece of metal looped to provide a carrying bail and handle bar, an axle secured to the ends of said looped frame, wheels on the axle and a non-collapsible receptacle comprising a bottom and side walls, the bottom of said receptacle being secured to said axle and the side walls of said receptacle being secured to and supported by the frame.

4. An article truck comprising, in combination, a non-collapsible receptacle having sides and a bottom, a wheeled support secured to said bottom, and handle means secured to said support and said receptacle and comprising a combined handle bar and carrying bail.

5. An article truck comprising in combination, a wheeled support, a receptacle attached to said support and an open substantially U-shaped frame, comprising side pieces and a cross-piece connecting said side pieces, connected to said wheeled support, said frame secured to and extending along the sides of the receptacle and projecting upward beyond the top thereof to form a combined carrying bail and handle bar for the truck.

6. An article truck comprising, in combination, a non-collapsible receptacle having sides and a bottom, an axle secured to said bottom, wheels on said axle, a support for the truck projecting from the bottom of said receptacle, and an elongated substantially U-shaped frame member, comprising side pieces, each secured at its lower end to the axle, said side pieces being joined at their upper ends to provide combined handle bar and carrying means for wheeling the truck or for lifting and carrying it.

7. An article truck, comprising, in combination, a comparatively narrow, non-collapsible receptacle having sides and a bottom, an axle secured to said bottom, wheels on said axle, a support for the truck projecting from the bottom of said receptacle and a looped U-shaped member extending along the sides of said receptacle and secured thereto and to said axle, said looped handle extending above the top of the receptacle and providing a cross bar or bail whereby the truck may be propelled or lifted and carried.

In testimony whereof I hereunto affix my signature.

GRACE T. CLAYTON.